United States Patent
Kiyomura et al.

[11] Patent Number: 5,978,203
[45] Date of Patent: Nov. 2, 1999

[54] ELECTRONIC PART HAVING COMMUNICATION MEANS

[75] Inventors: Yoshihiro Kiyomura, Onojo; Hiroshi Oishi, Miyazaki-ken; Katsutoshi Nakamatsu, Miyazaki-ken; Mitsuhiro Yamamoto, Miyazaki-ken, all of Japan

[73] Assignee: Matsushita Electric Industrial Co., Ltd., Osaka, Japan

[21] Appl. No.: 08/831,966

[22] Filed: Apr. 2, 1997

[30] Foreign Application Priority Data

Apr. 3, 1996 [JP] Japan ................................. 8-081247

[51] Int. Cl.⁶ ........................... H01G 4/00; H01G 2/12
[52] U.S. Cl. ...................... 361/301.3; 361/534; 361/535; 361/517
[58] Field of Search ..................... 361/517, 518, 361/519, 520, 521, 536, 534, 535, 537, 538, 301.3, 309, 307, 308.1; 338/234, 236, 237

[56] References Cited

U.S. PATENT DOCUMENTS

| | | |
|---|---|---|
| 2,203,902 | 6/1940 | Georgiev . |
| 3,214,649 | 10/1965 | Clargo et al. . |
| 3,248,613 | 4/1966 | Griffin et al. . |
| 3,688,162 | 8/1972 | Willy et al. . |
| 3,852,647 | 12/1974 | Ishii . |
| 3,878,440 | 4/1975 | Ando . |
| 3,904,939 | 9/1975 | Carino . |
| 4,745,521 | 5/1988 | De Lima Filho ........................ 361/272 |

FOREIGN PATENT DOCUMENTS

| | | |
|---|---|---|
| 2048581 | 1/1989 | Japan . |
| 4369821 | 12/1992 | Japan . |

*Primary Examiner*—Dean A. Reichard
*Assistant Examiner*—Anthony Dinkins
*Attorney, Agent, or Firm*—Stevens, Davis, Miller & Moshner, L.L.P.

[57] ABSTRACT

An electronic part such as a ceramic capacitor and a resistor used in various kinds of electric appliances has an apprehension that an electronic part element might be red-heated to be burnt when an abnormal current flows in spite of dielectric covering member, and therefore it has been impossible to supply a nonflammable electronic part having a stabilized performance. In the present invention, an electronic part is constructed such that since an electronic part element 8 such as a condenser or a resistor is put in a case 5 which in turn is nearly sealed to cut off the supply of oxygen, the electronic part is prevented from catching fire even if it generates heat, and since an opening 6 is formed in a portion of the case 5 or a sealing member 7 so as to allow the gas to be let out, when the electronic part generates heat to increase the pressure, the case 5 can be prevented from being ruptured. Accordingly, it is possible to provide a nonflammable electronic part having stabilized characteristics.

15 Claims, 3 Drawing Sheets ified (Embodiment 1) (Embodiment 1) # ELECTRONIC PART HAVING COMMUNICATION MEANS

BACKGROUND OF THE INVENTION

This invention relates to an electronic part such as a capacitor, a resistor and the like.

In recent years, in order to make sure of the safety of electric appliances using electronic parts, it is becoming a serious problem to make the electronic parts nonflammable. Current electronic parts are coated with a nonflammable organic or inorganic coating for practical use. However, these are not the truly satisfactory ones from the viewpoint of nonflammability.

For example, a ceramic capacitor is widely used in the electric appliances because of its excellent electrical characteristics and handling ability. A typical ceramic capacitor is covered with a flame deterrent coating such as an epoxy rein family coating and a silicone resin family coating. However, in cases where an extremely high voltage is applied to the electric appliances due to lightning or the like, the ceramic capacitor used in the electric appliances undergoes a dielectric breakdown so that a remarkably large overcurrent flows through the ceramic capacitor to heat it, resulting in an apprehension that the currently used flame deterrent coating material might not stand the heat generated to catch fire if worst comes to worst.

To avoid such problem of safety, Japanese Patent Unexamined Publication No. 4-369821 discloses an arrangement in which a lead portion is made of a material for fuse so that it melts to cut off the current when an overcurrent flows through it. Japanese Utility Model Registration No. 2048581 discloses an arrangement in which a capacitor is covered with a cap that is not completely stripped off at the time when the capacitor is exploded.

However, according to these arrangements, occurrence of fire is not perfectly suppressed, and therefore it is impossible to completely eliminate the possibility that the electric appliances may catch fire.

SUMMARY OF THE INVENTION

The present invention aims to solve the above problems of the prior art.

An object of the invention is to provide an electronic part which will never catch fire even when an overcurrent flows due to lightening or the like to thereby prevent electric appliances from catching fire to start a fire.

To achieve this end, in the present invention, an electronic part is constructed such that an electronic part element is put in a case which in turn is nearly sealed to cut off the supply of oxygen, and then the electronic part is prevented from catching fire even if it generates heat, and that an opening is formed in a portion of the case so as to allow the gas to be let out, when the electronic part generates heat to increase the pressure, the case can be prevented from being ruptured.

DETAILED DESCRIPTION OF THE PREFERRED EMBODIMENTS

In an electronic part of the invention, an electronic part element is put in a case which in turn is sealed, and an opening is formed in a portion of the case or a sealing member to provide communication means through which the inside of the case and the outside thereof communicate with each other. Accordingly, even if the electronic part element is heated due to an unexpected overcurrent, by letting the gas out of the case, the case is prevented from being ruptured, and the interior of the case is kept in a state of being short of oxygen, and then no flame is generated.

Further, a portion of the electronic part element may be held by the case or the sealing member, while the other portion of the electronic part element may be spaced apart from the case and the sealing member. It is preferable that the case or the sealing member holding a portion of the electronic part element is made of a dielectric material. Accordingly, a lead portion, which is a portion of the electronic part element, is held by the case or the sealing member while being electrically insulated, and the electronic part element body is fixed in the case without being in contact with an inner wall of the case, and therefore even if the electronic part element is heated due to an unexpected overcurrent, the case is prevented from melting and catching fire owing to heat.

Moreover, by regulating the dimension of the opening, the total area of the opening, the distance between the electronic part element and the inner wall of the case and the ratio of the volume of the case to the volume of the electronic part element, it is possible to control the inflow of oxygen, the outflow of high temperature gas, the temperature rise of the case and the like, with the result that the electronic part can avoid catching fire and the case can avoid being ruptured.

In addition, if a shielding member is provided in the case so as to be placed in front of the opening, when the electronic part element generates heat and gives off smoke from the opening attributed to an incomplete combustion of the coating and the like, the flowing speed of the gas shooting from the opening to the outside is lowered, with the result that a circuit board adjoining the electronic part and other electronic parts are prevented from being damaged.

Besides, if a tubular member is equipped on the outside of the opening, when the electronic part element generates heat and gives off smoke from the opening due to an incomplete combustion of the coating and the like, it is possible to guide the high temperature gas shooting from the opening to the outside to a predetermined space, with the result that a circuit board adjoining the electronic part and other electronic parts are prevented from being damaged.

Now, description will be given of detailed embodiments of the electronic part according to the present invention by referring to the accompanying drawings.

(Embodiment 1)

Figure 1:
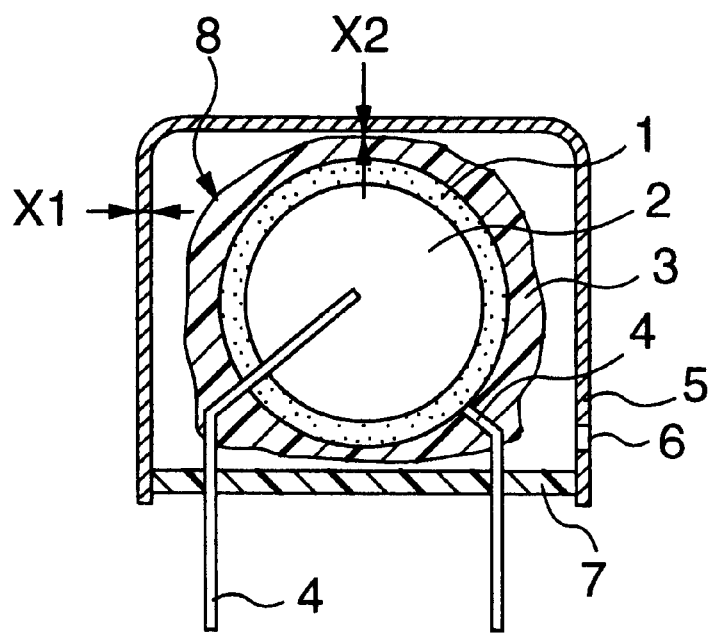
FIG. 1 is a sectional view of an electronic part according to an embodiment 1 of the present invention.
Figure 2:
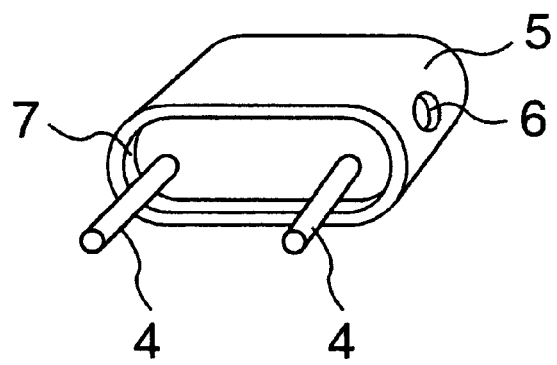
FIG. 2 is a perspective view of the electronic part shown in FIG. 1.

As shown in FIG. 1, a ceramic capacitor (electronic part element) 8 is prepared, in which electrodes 2 are attached to opposite sides of a disc ceramic substrate 1 and lead wires 4 are connected onto the respective electrodes 2, and these elements are coated by a coating material 3. The ceramic capacitor is put in a case 5 through an insertion port thereof, which port in turn is sealed with a sealing member 7. The case 5 has an opening 6. In the electronic part constructed in this way, the lead wires 4 of the ceramic capacitor is so held by the sealing member 7 that the ceramic capacitor neither swing in the case nor come in contact with the inner wall surface of the case 5.

The ceramic substrate 1 is made of a ferroelectric ceramic material such as barium titanate. The electrode 2 is made of a conductive material such as silver. The coating material 3 is a flame deterrent coating such as an epoxy resin family coating and a silicone resin family coating. The case 5 is selectively made of one of a metal, a ceramic material and a synthetic resin.

For the case 5 made of a metal, it is preferable to use aluminum, iron, copper or their alloys. For the case 5 made of a ceramic material, it is preferable to use a quartz, or an alumina, or a glass material and other ceramic material which has silicon oxide and aluminum oxide as bases thereof. For the case 5 made of a synthetic resin, it is favorable to use a thermoplastic or a thermosetting resin, and preferably a resin whose thermal deformation temperature is 100° C. or higher. In this specification, the thermal deformation temperature means a temperature measured by making use of a method A in which a bending stress applied to a test piece is 18.5 kgf/cm$^2$, or other method based on the method A, the method A being one of the methods of testing the load bending temperature of hard plastic prescribed in JIS-K7207.

Examples of thermoplastic resin whose thermal deformation temperature is 100° C. or higher are polyamide (PA) resin, polycarbonate (PC) resin, polyphenylene ether (PPE) resin, polybutyrene terephthalate (PBT) resin, polyphenylene sulfide (PPS) resin, polyethersulphone (PES) resin, polyetheretherketone (PEEK) resin, liquid crystal polymer (LCP) resin, polyetherimide (PEI) resin and polyamideimide (PAI) resin. Everyone of these resins undergoes thermal deformation at temperatures of 100° C. or higher and is worthy to be used alone in the present invention. However, the thermal deformation temperature of the resin can be further improved by mixing the resin with an inorganic enhancing filler having a high thermal resistance. As for the inorganic enchancing filler, used can be oxides such as silica; alumina; zirconia; magnesia; titanium dioxide; and iron oxide, compounds of oxides such as talc; tantalite; and mica, or glass fiber. Meanwhile, to the contrary, by adding such enchancing filler to the thermoplastic resin whose thermal deformation temperature is not over 100° C. if used solely, e.g., polypropylene resin, vinyl chloride resin and ABS resin, it is even possible to raise the thermal deformation temperature thereof to exceed 100° C., and therefore these resins can be made worthy to be used in the present invention.

Examples of thermosetting resin whose thermal deformation temperature is 100° C. or higher are silicone resin, fluororesin, epoxy resin, acrylic resin, polyester resin, melamine resin and urea resin. These resins are worthy to be used solely in this embodiment as well. However, the thermal deformation temperature of the resin can be further improved by mixing the resin with an inorganic filler having a high thermal resistance. As for the filler for increasing the thermal resistance, oxides such as silica; alumina; zirconia; magnesia; titanium dioxide; and iron oxide, compounds of oxides such as talc; tantalite; and mica, or glass fiber can be used.

As for the sealing member 7, one of resins of two-liquid-setting type, thermosetting type and ultraviolet-setting type, is used.

The opening 6 is in the form of a circle in this embodiment, but it may be in the form of a polygon such as a triangle and a quadrangle, a star, an ellipse, or a crescent. Only one opening 6 is provided in the case 5, but the same effect can also be obtained even if a plurality of openings are formed.

The opening 6 may be a circle ranging in diameter from 0.1 mm to 5 mm, or a circle or other shape whose total area ranges from 0.008 mm$^2$ to 20 mm$^2$. By setting the area of the opening 6 as described above, even if the electronic part element 8 explosively generates heat attributed to an abnormal current, it is possible to prevent the occurrence of flame, provided that the gas generated in the case is let out of the case 5 through the opening 6 and the interior of the case is kept in an oxygen free state. If the area of the opening 6 is 0.008 mm$^2$ or less, in the event that the electronic part element 8 explosively generates heat due to an abnormal current, the case 5 may not stand the pressure of the gas generated in the case 5 to be ruptured. Rupture of the case 5 may cause the heated electronic part element 8 to catch fire due to the influence of oxygen in the air. On the other hand, if the area of the opening 6 is 20 mm$^2$ or more, in the event that the electronic part element 8 generates heat owing to an abnormal current, oxygen in the air is allowed to enter the case 5 through the opening 6, so that the heated electronic part element 8 may catch fire.

The average thickness X1 of the case 5 is set to be in the range of 0.4 mm to 5 mm. By setting the average thickness X1 of the case 5 to be in the above range, even if the electronic part element 8 explosively generates heat attributed to an abnormal current, it is possible to prevent the occurrence of flame, provided that the wall of the case stands heat, the gas generated in the case is let out of the case 5 through the opening 6, and the interior of the case is kept in an oxygen free state. If the average thickness X1 of the case 5 is 0.4 mm or less, in the event that the electronic part element 8 explosively generates heat due to an abnormal current, the wall of the case may not stand heat to be broken. This allows oxygen in the air to enter the case so that the heated electronic part may catch fire. Meanwhile, if the average thickness X1 of the case 5 is 5 mm or more, even if the electronic part element 8 explosively generates heat due to an abnormal current, the wall of the case can stand heat to prevent the electronic part from catching fire, but the outside dimensions of the electronic part are made too large to be applicable to the practical use.

It is advisable that the minimum distance X2 between the electronic part element 8 and the case 5 is set to be not less than 0.01 mm. By setting the distance X2 more than 0.01 mm even if the electronic part element 8 explosively generates heat attributed to an abnormal current, it is possible to prevent the occurrence of flame, provided that the wall of the case stands heat, the gas generated in the case 5 is let out of the case 5 through the opening 6, and the interior of the case 5 is kept in an oxygen free state. If the distance X2 is 0.01 mm or less, in the event that the electronic part element 8 explosively generates heat due to an abnormal current, the wall of the case 5 may not stand heat to be broken. This allows oxygen in the air to enter the case 5 so that the heated electronic part may catch fire.

The ratio of the volume of the electronic part element 8 body to the volume of the case 5 is set to be not less than 1:1.1 and nor more than 1:10. By setting the volume ratio to be in the above range, even if the electronic part element 8 explosively generates heat attributed to an abnormal current, it is possible to prevent the occurrence of flame, provided that the wall of the case 5 stands heat, the gas generated in the case 5 is let out of the case 5 through the opening 6, and the interior of the case 5 is kept in an oxygen free state. If the volume ratio is 1:1.1 or less, in the event that the electronic part element 8 explosively generates heat due to an abnormal current, the wall of the case 5 may not stand heat to be broken. This allows oxygen in the air to enter the case 5 so that the heated electronic part may catch fire. Meanwhile, if the volume ratio is 1:10 or more, even if the electronic part element 8 explosively generates heat due to an abnormal current, the wall of the case 5 can stand heat to prevent the electronic part from catching fire, but the outside dimensions of the electronic part are made too large to be applicable to the practical use.

(Embodiment 2)

Figure 3:
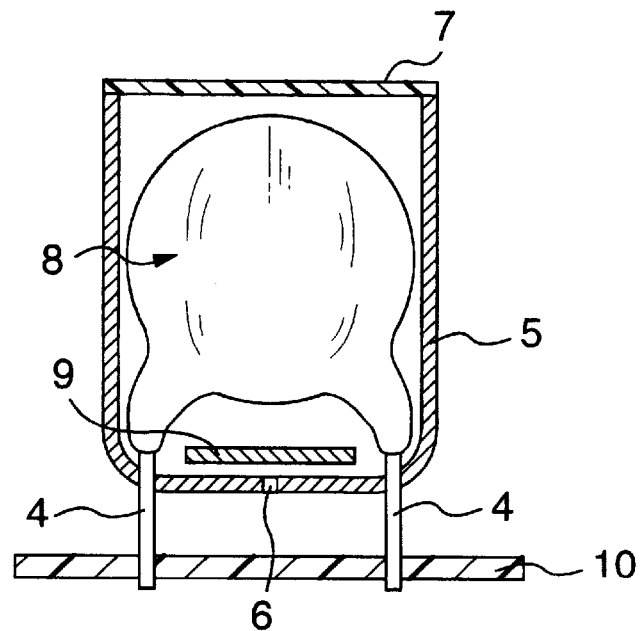
FIGS. 3 to 5 are sectional views of electronic parts according to embodiments 2–4 of the present invention, respectively.

FIG. 3 is a sectional view showing an embodiment 2 of the present invention. In this embodiment, an electronic part element 8 is placed in a case 5 with lead wires 4 thereof partially fixed to the case 5, and the case 5 is sealed with a sealing member 7. An opening 6 is formed in the case 5. The lead wires 4 of the electronic part element 8 in the case 5 are fixed to a circuit board 10. If the case 5 is made of a conductive metal, it is required to dispose isolation members between the case 5 and the lead wires 4 to prevent a short-circuit therebetween.

As shown in FIG. 3, in the embodiment 2, a shielding member 9 is provided in the case 5 so as to be located in front of the opening 6. Due to the provision of the shielding member 9, even if the electronic part element 8 explosively generates heat attributed to an abnormal overcurrent, it is possible to weaken the force of the red-heated shooting gas generated from the electronic part element 8, with the result that the red-heated shooting gas is prevented from dispersing directly to the outside of the case 5 to burn the neighboring combustibles.

(Embodiment 3)

Figure 4:
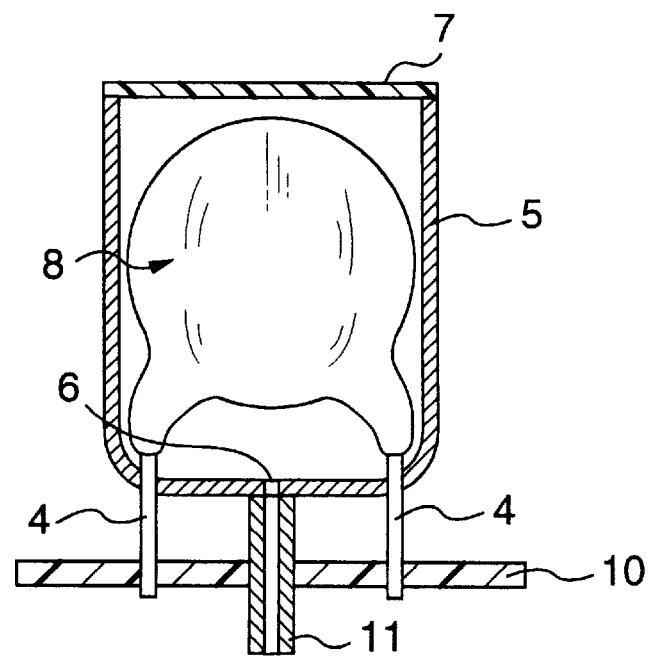

As shown in FIG. 4, an embodiment 3 of the present invention is substantially the same as the embodiment 2 except that a separate tubular pipe 11 is equipped to an opening 6 of a case 5 instead of the shielding member 9.

Due to the provision of the tubular pipe 11, even if an electronic part element 8 explosively generates heat attributed to an abnormal overcurrent, it is possible to guide the high temperature gas generated from the electronic part element 8 to a predetermined space, with the result that the neighboring electronic parts can be prevented from being heated and deteriorated by the high temperature gas generated from the electronic part element 8.

(Embodiment 4)

Figure 5:
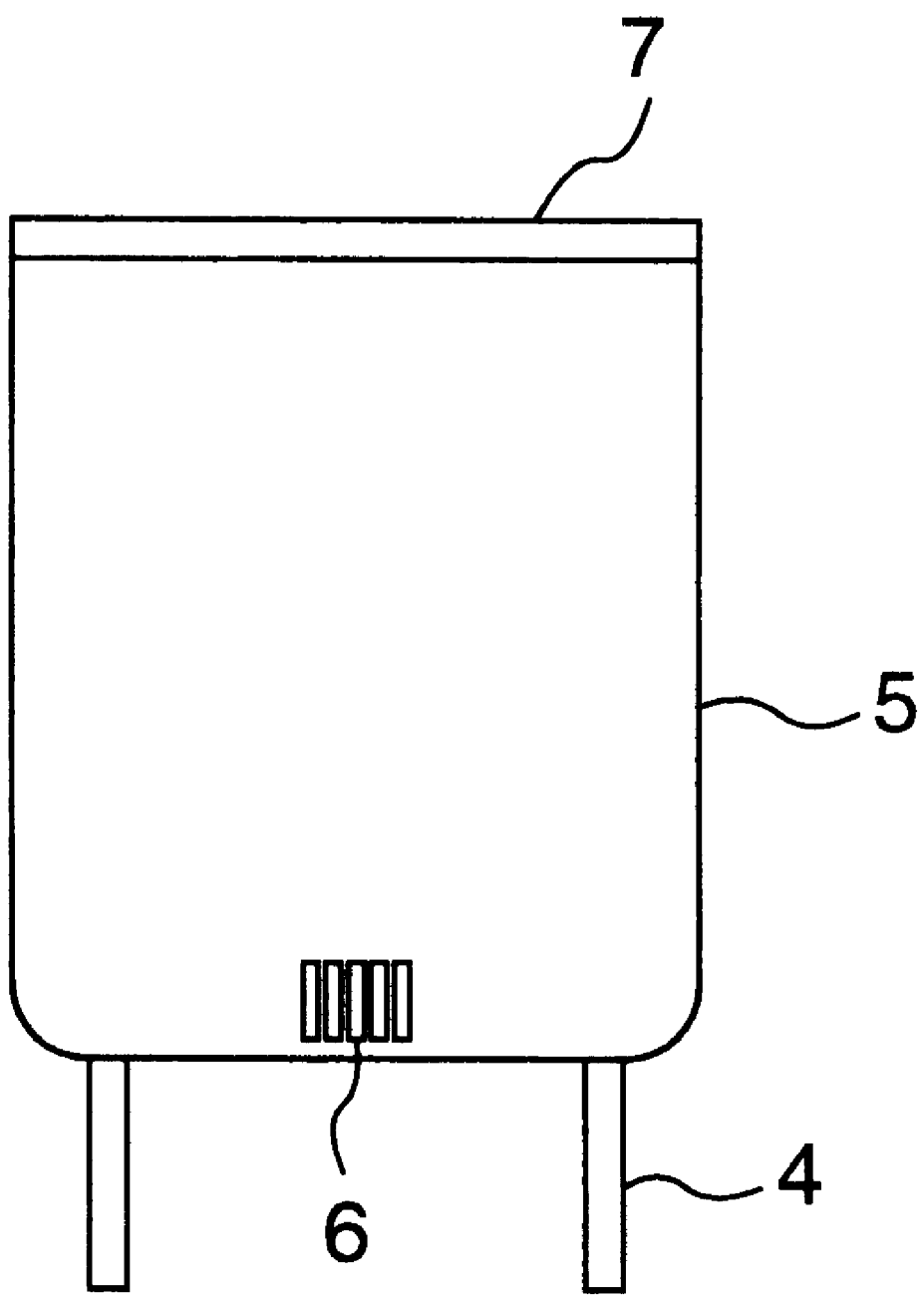

In an embodiment of the present invention shown in FIG. 5, an electronic part element is disposed within a case 5. The lead wires 4 of the electronic part element are fixed to the case 5. An opening of the case 5 is sealed by a sealing member 7. If the case 5 is made of a conductive metal, it is required to dispose isolation members between the case 5 and the lead wires 4 to prevent a short-circuit therebetween. A plurality of rectangular openings 6 are formed in a wall of the case 5. These openings 6 are in the form of a lattice.

Due to provision of the openings 6, even if the electronic part element explosively generates heat attributed to an abnormal overcurrent, it is possible to prevent the occurrence of flame, provided that the case 5 stands heat, and the gas generated in the case 5 is let out of the case 5 through the openings 6 and the interior of the case 5 is kept in an oxygen free state.

Incidentally, the tubular pipe 11 may be integrated with the case 5.

In the embodiments 1 to 4, the ceramic capacitor has been described as the electronic part element, however the same effect can be obtained even if the electronic part element is other type of capacitor such as an electrolytic capacitor, a resistor or the like.

Now, detailed description will be given of examples of the electronic part according to the present invention, employing the above-described ceramic capacitor. The ceramic capacitor is a disc type ceramic capacitor which is rated at 2 kV DC and 1000 pF, and whose diameter and thickness are 9.5 mm and 3 mm, respectively. A disc ceramic substrate made of barium titanate is coated on opposite sides thereof with circular silver paste and then baked into the ceramic capacitor. A copper lead wire is soldered to each of electrodes, and the capacitor is further covered with a flame deterrent epoxy resin in its entirety.

EXAMPLE 1

A disc type ceramic capacitor is put in a rectangular parallelepiped-shaped case of aluminum whose outer dimensions and thickness are 15 mm×13 mm×5 mm and 0.5 mm, respectively. An entrance of the case, as well as lead wires of the capacitor, is sealed with a flame deterrent epoxy resin, thus preparing a specimen. The specimen has a structure that an interior of the case is hollow and an opening of diameter 1 mm is formed in a wall of the case.

EXAMPLE 2

A disc type ceramic capacitor is put in a cylindrical case of stainless steel whose outer diameter, height and thickness are 15 mm, 15 mm and 0.5 mm, respectively. An entrance of the case, as well as lead wires of the capacitor, is sealed with a flame deterrent epoxy resin, thus preparing a specimen. The specimen has a structure that the interior of the case is hollow and an opening of diameter 1 mm is formed in wall of the case.

EXAMPLE 3

A disc type ceramic capacitor is put in a cylindrical case of aluminum whose outer diameter, height and thickness are 12 mm, 15 mm and 0.5 mm, respectively. An entrance of the case, as well as lead wires of the capacitor, is sealed with a flame deterrent epoxy resin, thus preparing a specimen. The specimen has a structure that the interior of the case is hollow, an opening of diameter 1 mm is formed in a wall of the case, and the shortest distance from the capacitor to the wall of the case is 0.5 mm.

EXAMPLE 4

A disc type ceramic capacitor is put in a cylindrical case of aluminum whose outer diameter, height and thickness are 15 mm, 15 mm and 0.5 mm, respectively. An entrance of the case, as well as lead wires of the capacitor, is sealed with a flame deterrent epoxy resin, thus preparing a specimen. The specimen has a structure that the interior of the case is hollow, an opening of diameter 1 mm is formed in a wall of the case, and the shortest distance from the capacitor to the wall of the case is 2 mm.

EXAMPLE 5

A disc type ceramic capacitor is put in a cylindrical case of aluminum whose outer diameter, height and thickness are 15 mm, 15 mm and 0.5 mm, respectively. An entrance of the case, as well as lead wires of the capacitor, is sealed with a flame deterrent epoxy resin, thus preparing a specimen. The specimen has a structure that the interior of the case is hollow, an opening of diameter 1 mm is formed in a wall of the case, and the volume ratio of the capacitor to the case is 1:10.

EXAMPLE 6

A disc type ceramic capacitor is put in a cylindrical case of aluminum whose outer diameter, height and thickness are 12 mm, 15 mm and 0.5 mm, respectively. An entrance of the case, as well as lead wires of the capacitor, is sealed with a flame deterrent epoxy resin, thus preparing a specimen. The specimen has a structure that the interior of the case is hollow, an opening of diameter 1 mm is formed in a wall of the case, and the volume ratio of the capacitor to the case is 1:8.

EXAMPLE 7

A disc type ceramic capacitor is put in a cylindrical case of aluminum whose outer diameter, height and thickness are 15 mm, 15 mm and 0.5 mm, respectively. An entrance of the case, as well as lead wires of the capacitor, is sealed with a flame deterrent epoxy resin, thus preparing a specimen. The specimen has a structure that the interior of the case is hollow, an opening of diameter 1 mm is formed in a wall of the case, and the volume ratio of the capacitor to the case is 1:2.

EXAMPLE 8

A disc type ceramic capacitor is put in a case molded from a thermoplastic resin with inner dimensions 15 mm×13 mm×6 mm and a thickness 0.8 mm. A lid molded from the same resin with dimensions 15 mm×6 mm and a thickness 0.8 mm is glued to an entrance of the case to seal it, thus preparing a specimen. The thermoplastic resin used is Polyphenylene Sulfide A504 made by Toray Industry, Inc. The specimen has a structure that a circular opening of diameter 1.5 mm is formed in a wall of the case.

EXAMPLE 9

A disc type ceramic capacitor is put in a quartz tube with inner dimensions ø12 mm×13 mm and a thickness 0.8 mm. An entrance of the tube is sealed with an epoxy resin, thus preparing a specimen. The specimen has a structure that a circular opening of diameter 1 mm is formed in a wall of the case.

EXAMPLE 10

A disc type ceramic capacitor is put in a case molded from a thermoplastic resin with inner dimensions 15 mm×13 mm×6 mm and a thickness 0.8 mm. A cover molded from the same resin with dimensions 15 mm×6 mm and a thickness 0.8 mm is glued to an entrance of the case to seal it, thus preparing a specimen. The thermoplastic resin used is Polyamide F5100 made by UNITIKA, Ltd. The specimen has a structure that a circular opening of diameter 1 mm is formed in a wall of the case.

EXAMPLE 11

A disc type ceramic capacitor is put in a case molded from a thermoplastic resin with inner dimensions 15 mm×13 mm×6 mm and a thickness 0.8 mm. A cover molded from the same resin with dimensions 15 mm×6 mm and a thickness 0.8 mm is glued to an entrance of the case to seal it, thus preparing a specimen. The thermoplastic resin used is Polyamide F5100 made by UNITIKA, Ltd. The specimen has a structure that five rectangular openings each of 0.5 mm×3 mm are formed in a wall of the case.

EXAMPLE 12

A disc type ceramic capacitor is put in a case molded from a thermoplastic resin with inner dimensions 15 mm×13 mm×6 mm and a thickness 0.8 mm. A cover molded from the same resin with dimensions 13 mm×6 mm and a thickness 0.8 mm is glued to an entrance of the case to seal it, thus preparing a specimen. The thermoplastic resin used is Liquid Crystal Polymer LC5030 made by UNITIKA, Ltd. The specimen has a structure that three circular openings each having an area of 0.25 mm$^2$ are formed in a wall of the case.

EXAMPLE 13

A disc type ceramic capacitor is put in a case molded from a thermoplastic resin with inner dimensions 15 mm×13 mm×6 mm and a thickness 0.8 mm. A cover molded from the same resin with dimensions 13 mm×6 mm and a thickness 0.8 mm is glued to an entrance of the case to seal it, thus preparing a specimen. The thermoplastic resin used is Liquid Crystal Polymer LC5030 made by UNITIKA, Ltd. The specimen has a structure that six circular openings each having an area of 0.2 mm$^2$ are formed in a wall of the case.

EXAMPLE 14

A disc type ceramic capacitor is put in a case molded from a thermoplastic resin with inner dimensions 15 mm×13 mm×6 mm and a thickness 0.8 mm. A cover molded from the same resin with dimensions 13 mm×6 mm and a thickness 0.8 mm is glued to an entrance of the case to seal it, thus preparing a specimen. The thermoplastic resin used is Liquid Crystal Polymer LC5030 made by UNITIKA, Ltd. The specimen has a structure that three square openings each having an area of 1 mm$^2$ are formed in a wall of the case.

EXAMPLE 15

A disc type ceramic capacitor is put in a case molded from a thermoplastic resin with inner dimensions 15 mm×13 mm×6 mm and a thickness 0.8 mm. A cover molded from the same resin with dimensions 13 mm×6 mm and a thickness 0.8 mm is glued to an entrance of the case to seal it, thus preparing a specimen. The thermoplastic resin used is Polybutyrene Terephthalate BT2230 made by Dai Nippon Ink & Chemicals Inc. The specimen has a structure that a circular opening of diameter 1 mm is formed in a wall of the case, and a screen molded as a shielding member described above from the same resin with dimensions 5 mm×5 mm and a thickness 0.8 mm is provided in an inner wall surface of the case so as to face to the opening.

The screen is glued to the inner wall surface of the case through thermosetting resin, or welded by means of ultrasonic welding or high frequency welding.

EXAMPLE 16

A disc type ceramic capacitor is put in a case molded from a thermoplastic resin with inner dimensions 15 mm×13 mm×6 mm and a thickness 0.8 mm. A cover molded from the same resin with dimensions 13 mm×6 mm and a thickness 0.8 mm is glued to an entrance of the case to seal it, thus preparing a specimen. The thermoplastic resin used is Liquid Crystal Polymer LC5030 made by UNITIKA, Ltd. The specimen has a structure that a circular opening of diameter 1 mm is formed in a wall of the case, and a tubular pipe of aluminum whose inner diameter, thickness and length are 1 mm, 0.5 mm and 20 mm, respectively, is connected to the opening so as to project outside.

CONVENTIONAL EXAMPLE 1

The above-described disc type ceramic capacitor which is rated at 2 kV DC and 1000 pF, whose diameter and thickness are 9.5 mm and 3 mm, respectively.

COMPARISON 1

A disc type ceramic capacitor is put in an aluminum case whose outer dimensions and thickness are 15 mm×13mm×5 mm and 0.5 mm, respectively. An entrance of the case, as well as lead wires of the capacitor, is sealed with a flame deterrent epoxy resin, thus preparing a specimen. The specimen has a structure that the interior of the case is hollow and an opening of diameter 0.05 mm is formed in a portion of the wall of the case.

COMPARISON 2

A disc type ceramic capacitor is put in an aluminum case whose outer dimensions and thickness are 15 mm×13mm×5 mm and 0.5 mm, respectively. An entrance of the case, as well as lead wires of the capacitor, is sealed with a flame deterrent epoxy resin, thus preparing a specimen. The specimen has a structure that the interior of the case is hollow and an opening of diameter 7 mm is formed in a wall of the case.

COMPARISON 3

A disc type ceramic capacitor is put in an aluminum case whose outer dimensions and thickness are 15 mm×13 mm×4 mm and 0.5 mm, respectively. An entrance of the case, as well as lead wires of the capacitor, is sealed with a flame deterrent epoxy resin, thus preparing a specimen. The specimen has a structure that the interior of the case is hollow, an opening of diameter 1 mm is formed in a wall of the case, and the capacitor is in contact with the wall of the case.

COMPARISON 4

A disc type ceramic capacitor is put in a tin case whose outer diameter, height and thickness are 250 mm, 300 mm and 1.0 mm, respectively. An entrance of the case, as well as lead wires of the capacitor, is sealed with a flame deterrent epoxy resin, thus preparing a specimen. The specimen has a structure that the interior of the case is hollow, an opening of diameter 1 mm is formed in a wall of the case, and the capacitor is kept away at a distance of not less than 100 mm from the wall of the case.

COMPARISON 5

A disc type ceramic capacitor is put in a case molded from a thermoplastic resin with inside dimensions 15 mm×13 mm×6 mm and a thickness 0.8 mm, and a cover molded from the same resin with dimensions 15 mm×6 mm and a thickness 0.8 mm is glued to an entrance of the case to seal it, thus preparing a specimen. The thermoplastic resin used is Liquid Crystal Polymer LC5030 made by UNITIKA, Ltd. The specimen has a structure that no opening is formed and junctions of the case and lead wires are completely sealed with an adhesive of epoxy resin family.

COMPARISON 6

A disc type ceramic capacitor is put in a case molded from a thermoplastic resin with inner dimensions 15 mm×13 mm×6 mm and a thickness 0.8 mm. A cover molded from the same resin with dimensions 15 mm×6 mm and a thickness 0.8 mm is glued to an entrance of the case to seal it, thus preparing a specimen. The thermoplastic resin used is Polycarbonate G-3130 made by Teijin Chemical Industry Co., Ltd. The specimen has a structure that a circular opening of diameter 10 mm is formed in a wall of the case.

COMPARISON 7

A disc type ceramic capacitor is put in a case molded from a thermoplastic resin with inner dimensions 15 mm×13 mm×6 mm and a thickness 0.8 mm. A cover molded from the same resin with dimensions 15 mm×6 mm and a thickness 0.8 mm is glued to an entrance of the case to seal it, thus preparing a specimen. The thermoplastic resin used is Polypropylene ME140 made by Tokuyama Soda Co., Ltd. The molded piece of ME140 have a thermal deformation temperature of 55° C. The specimen has a structure that a circular opening of diameter 1 mm is formed in a wall of the case.

COMPARISON 8

A disc type ceramic capacitor is put in a case molded from a thermoplastic resin with inner dimensions 15 mm×13 mm×6 mm and a thickness 0.2 mm. A cover molded from the same resin with dimensions 15 mm×6 mm and a thickness 0.8 mm is glued to an entrance of the case to seal it, thus preparing a specimen. The thermoplastic resin used is Liquid Crystal Polymer LC5030 made by UNITIKA, Ltd. The specimen has a structure that a circular opening of diameter 1 mm is formed in a wall of the case.

Nonflammability test was conducted on the examples, comparisons and conventional example described above. The manner of testing and evaluating the nonflammability is as follows.

When testing the nonflammability, a withstand voltage tester (0–10 kV DC) was first used to cause dielectric breakdown in each of the specimens. After connecting the specimen to the withstand voltage tester, a voltage applied between two electrodes was gradually increased until the dielectric breakdown occurred to decrease the voltage between the electrodes. For everyone of the examples, conventional example and comparisons, ten specimens were subjected to this operation. After the dielectric breakdown has occurred, every specimen was connected to an overcurrent sensor withstand voltage tester (maximum supply capability: AC 600V, 7A) so as to observe the state of combustion after the electricity was supplied to the capacitor for one second.

Evaluation was performed in such a manner that when the capacitor was punctured by the above test method, occurrence of fire, generation of smoke and the conditions of the specimen were observed. In this specification, "occurrence of fire" was ascertained from the result of the visual inspection of the conditions of the specimen about whether or not a flame was seen.

Results of the nonflammability test were shown in Table 1.

TABLE 1

Results of Nonflammability Test

| Classification | Occurrence of fire | Generation of smoke | Conditions of Specimen |
|---|---|---|---|
| Example 1 | None | Generated | Case was heated |
| Example 2 | None | Generated | Case was heated |
| Example 3 | None | Generated | Case was heated |
| Example 4 | None | Generated | Case was heated |
| Example 5 | None | Generated | Case was heated |
| Example 6 | None | Generated | Case was heated |
| Example 7 | None | Generated | Case was heated |
| Example 8 | None | Generated | Case was heated |
| Example 9 | None | Generated | Case was heated |
| Example 10 | None | Generated | Case was heated |
| Example 11 | None | Generated | Case was heated |
| Example 12 | None | Generated | Case was heated |

TABLE 1-continued

Results of Nonflammability Test

| | | | |
|---|---|---|---|
| Example 13 | None | Generated | Case was heated |
| Example 14 | None | Generated | Case was heated |
| Example 15 | None | Generated | Case was heated |
| Example 16 | None | Generated | Case was heated |
| Conventional Example 1 | Occurred | Generated | Fired with a pillar of flames rising to a height of about 10 cm |
| Comparison 1 | Occurred | Generated | Case was broken, collapsed and caught fire |
| Comparison 2 | Occurred | Generated | Fire started in opening portion |
| Comparison 3 | Occurred | Generated | Case was broken, collapsed and caught fire |
| Comparison 4 | None | Generated | Case was heated |
| Comparison 5 | Occurred | Generated | Case was broken and caught fire |
| Comparison 6 | Occurred | Generated | Fire started in opening portion |
| Comparison 7 | Occurred | Generated | Case was broken, collapsed and caught fire |
| Comparison 8 | Occurred | Generated | Case was broken, collapsed and caught fire |

All the specimens of the examples 1 to 16 never caught fire but gave off a little smoke. All the specimens of the conventional example 1 caught fire with a pillar of flames rising to a height of about 10 cm and generated a large amount of smoke. Concerning the specimens of the comparison 1, the case of every specimen was broken and collapsed with the explosion and then the capacitor caught fire to generate a large amount of smoke. As to the comparison 2, six specimens caught fire in the opening portion to give off smoke. The remaining four specimens never caught fire but gave off a little smoke. Regarding the comparison 3, the cases of three specimens were broken and collapsed and then capacitors thereof caught fire to generate a large amount of smoke. The remaining seven specimens never caught fire but gave off a little smoke. Concerning the comparison 4, all the specimens never caught fire but gave off a little smoke. As to the comparison 5, the cases of all the specimens were broken and collapsed with the explosion and then the capacitors thereof caught fire to generate a large amount of smoke. Regarding the comparison 6, every specimen caught fire in the opening portion to give off smoke. As to the comparison 7, the case of every specimen was deformed and broken to cause the capacitor to catch fire and give off smoke. Regarding the comparison 8, the cases of eight specimens were deformed and broken to cause the capacitors to catch fire and give off smoke. The remaining two specimens never caught fire but gave off a little smoke.

As is evident from the above results, it is confirmed that the electronic part according to the present invention is remarkably enhanced in nonflammability.

As has been described above in detail, according to the present invention, it is possible to provide a nonflammable electric part having stabilized characteristics which, when used in the electric appliances, will never catch fire even if it is heated due to an overcurrent or the like, by making use of a simple and easy method in which an electronic part is manufactured by sealing an existing electronic part element such as a capacitor, resistor or the like in a case with opening.

What is claimed is:

1. An electronic part comprising:
   a case;
   an electronic part element disposed in said case;
   a sealing member for sealing said case; and
   communication means for enabling open communication in an original manufactured state of said electronic part between an interior of said case and an exterior thereof.

2. An electronic part according to claim 1, wherein a portion of said electronic part element is held by said case or said sealing member, while a remainder portion of said electronic part element is spaced apart from said case and said sealing member.

3. An electronic part according to claim 2, wherein said portion held by the case or the sealing member is a lead wire.

4. An electronic part according to claim 2, wherein said case is made of a synthetic resin whose thermal deformation temperature is not less than 100° C.

5. An electronic part according to claim 2, wherein said case is made of a metal.

6. An electronic part according to claim 1, wherein said case is made of a synthetic resin whose thermal deformation temperature is not less than 100° C.

7. An electronic part according to claim 1, wherein said case is made of a metal.

8. An electronic part according to claim 1, wherein said electronic part element is a capacitor.

9. An electronic part according to claim 1, wherein said sealing member is made of a dielectric material.

10. An electronic part according to claim 1, wherein said sealing member is made of one of resins of two-liquid-setting type, thermosetting type and ultraviolet-setting type.

11. An electronic part according to claim 1, wherein said communication means is an opening.

12. An electronic part comprising:
    a case;
    an electronic part element disposed in said case;
    a sealing member for sealing said case; and
    communication means through which an interior of said case is communicated with an exterior thereof,
    wherein said communication means is an opening in said case, which is equipped with a pipe having a length equal to or greater than a thickness of said case.

13. An electronic part comprising:
    a case;
    an electronic part element disposed in said case;
    a sealing member for sealing said case; and
    communication means through which an interior of said case is communicated with an exterior thereof,
    wherein said communication means is an opening in said case, and a shielding member is provided within said case so as to face said opening.

14. An electronic part comprising:
    a case;
    an electronic part element disposed in said case;
    a sealing member for sealing said case; and
    communication means through which an interior of said case is communicated with an exterior thereof,
    wherein a portion of said electronic part element is held by one of said case and said sealing member, while a remainder portion of said electronic part element is spaced apart from said one of said case and said sealing member, wherein a distance from said one of said case and said sealing member to said remainder portion of said electronic part element is not less than 0.01 mm or more than a maximum gap between inner wall surfaces of opposite side walls of said case.

15. An electronic part comprising:

a case;

an electronic part element disposed in said case;

a sealing member for sealing said case; and communication means through which an interior of said case is communicated with an exterior thereof, wherein a ratio of the volume of said case to the volume of said electronic part element is not less than 1:1.1.

* * * * *